United States Patent
Saka et al.

(10) Patent No.: US 10,243,196 B2
(45) Date of Patent: Mar. 26, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hideyuki Saka, Toyota (JP); Keiichi Takahashi, Nishinomiya (JP); Hideaki Fujita, Kyotanabe (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 112 days.

(21) Appl. No.: 15/508,765

(22) PCT Filed: Sep. 2, 2015

(86) PCT No.: PCT/IB2015/001493
§ 371 (c)(1),
(2) Date: Mar. 3, 2017

(87) PCT Pub. No.: WO2016/038438
PCT Pub. Date: Mar. 17, 2016

(65) Prior Publication Data
US 2017/0256776 A1 Sep. 7, 2017

(30) Foreign Application Priority Data
Sep. 8, 2014 (JP) .................... 2014-182333

(51) Int. Cl.
*H01M 4/131* (2010.01)
*H01M 2/34* (2006.01)
(Continued)

(52) U.S. Cl.
CPC ........... *H01M 2/345* (2013.01); *H01M 4/131* (2013.01); *H01M 4/364* (2013.01); *H01M 4/366* (2013.01);
(Continued)

(58) Field of Classification Search
None
See application file for complete search history.

(56) References Cited

U.S. PATENT DOCUMENTS

| | | | | |
|---|---|---|---|---|
| 2006/0099495 A1* | 5/2006 | Suzuki | .................. | H01M 2/021 429/128 |
| 2007/0054185 A1* | 3/2007 | Abe | ...................... | C07C 309/66 429/200 |
| 2008/0248390 A1 | 10/2008 | Yada et al. | | |
| 2010/0119945 A1* | 5/2010 | Akagi | .................. | H01M 4/131 429/231.8 |

(Continued)

FOREIGN PATENT DOCUMENTS

| | | |
|---|---|---|
| CN | 1964101 A | 5/2007 |
| CN | 103730686 A | 4/2014 |

(Continued)

OTHER PUBLICATIONS

JP 2009-252498 A—Machine translation (Year: 2009).*

*Primary Examiner* — Sarah A. Slifka
*Assistant Examiner* — Haroon S. Sheikh
(74) *Attorney, Agent, or Firm* — Sughrue Mion, PLLC

(57) ABSTRACT

A positive electrode mixture layer (12) includes a first layer (12a) that has a main surface MS and a second layer (12b) formed closer to the positive electrode current collector (11) side than the first layer (12a). A ratio of the volume of the first layer (12a) to the volume of the positive electrode mixture layer (12) is 20 to 75 vol %. The first layer (12a) contains lithium iron phosphate (LFP) (1) and lithium nickel cobalt manganese composite oxide (NCM) (2). A ratio of the mass of the LFP (1) to the total mass of the LFP (1) and the NCM (2) in the first layer (12a) is more than 0 and 80 mass % or less. The second layer (12b) contains NCM (2). A ratio of the mass of the LFP (1) to the total mass of the positive electrode active material in the positive electrode mixture layer (12) is 7.5 to 20 mass %. A maximum pore size of the first layer (12a) is 0.50 to 0.70 μm.

5 Claims, 11 Drawing Sheets

(51) Int. Cl.

| | | |
|---|---|---|
| *H01M 4/36* | (2006.01) | |
| *H01M 4/505* | (2010.01) | |
| *H01M 4/525* | (2010.01) | |
| *H01M 4/58* | (2010.01) | |
| *H01M 10/052* | (2010.01) | |
| *H01M 10/42* | (2006.01) | |
| *H01M 4/1391* | (2010.01) | |
| *H01M 4/02* | (2006.01) | |

(52) U.S. Cl.
CPC ........... *H01M 4/505* (2013.01); *H01M 4/525* (2013.01); *H01M 4/5825* (2013.01); *H01M 10/052* (2013.01); *H01M 10/4235* (2013.01); *H01M 4/1391* (2013.01); *H01M 2004/028* (2013.01); *H01M 2200/20* (2013.01)

(56) References Cited

U.S. PATENT DOCUMENTS

| | | | |
|---|---|---|---|
| 2012/0288759 A1* | 11/2012 | Nagai | ................. H01M 4/13 429/211 |
| 2014/0106189 A1 | 4/2014 | Ebisuzaki et al. | |
| 2015/0333323 A1 | 11/2015 | Umeyama et al. | |

FOREIGN PATENT DOCUMENTS

| | | | |
|---|---|---|---|
| JP | 2008-235150 A | | 10/2008 |
| JP | 2009-252498 A | * | 10/2009 |
| JP | 2011-228293 A | | 11/2011 |
| JP | 2013-235653 A | | 11/2013 |
| JP | 2015-220121 A | | 12/2015 |
| KR | 20140070259 A | | 6/2014 |

\* cited by examiner

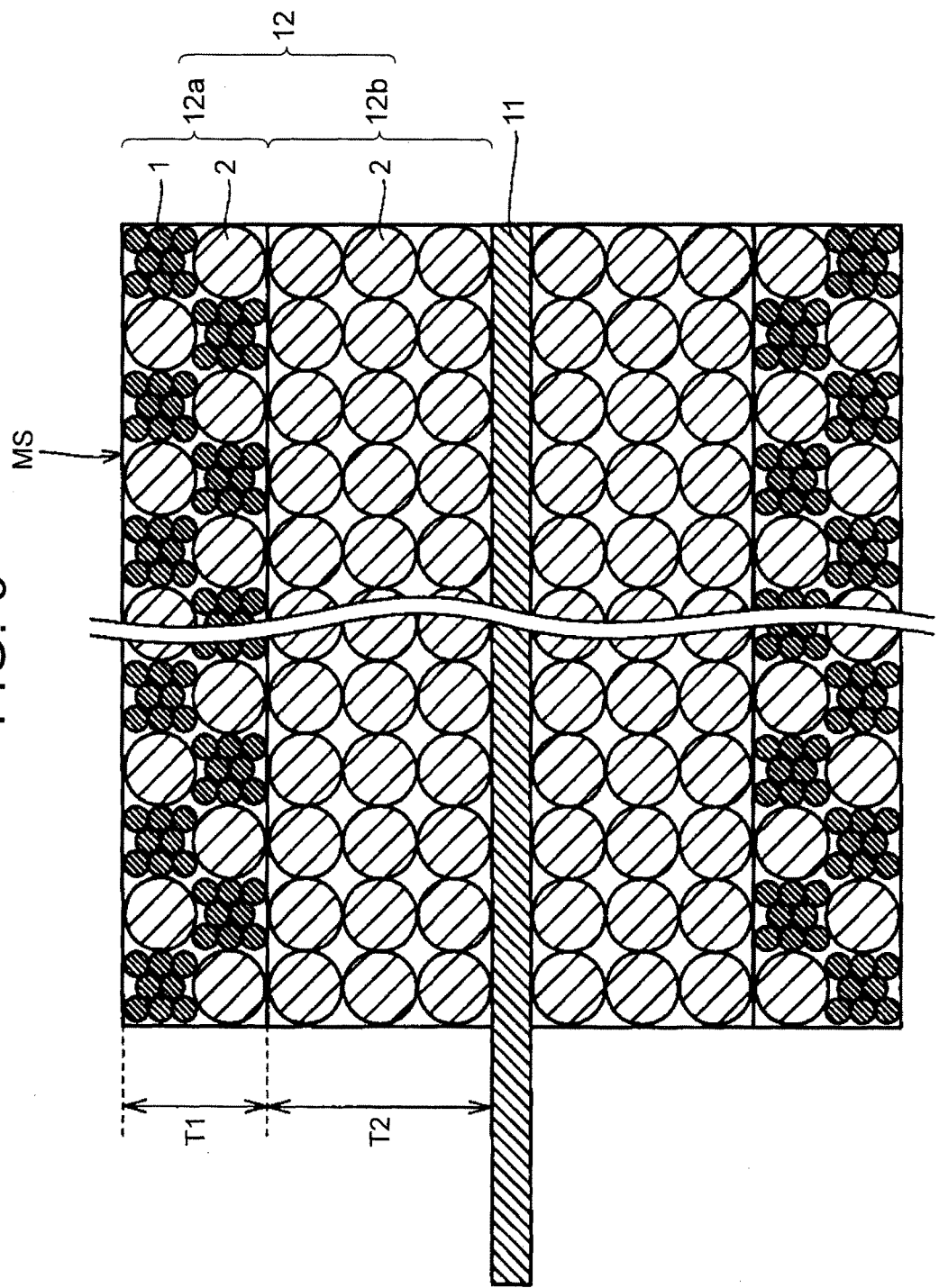

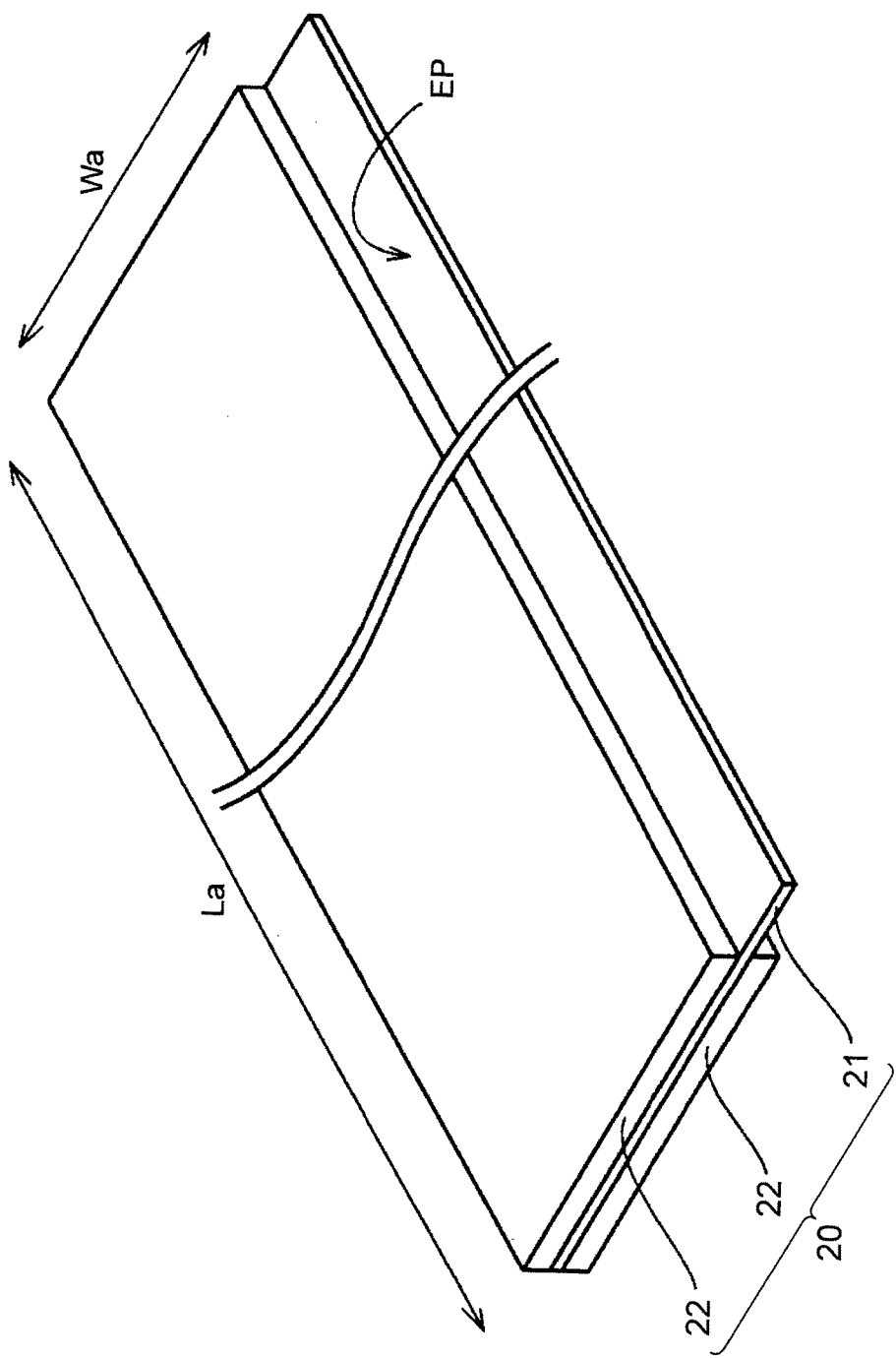

FIG. 7

TABLE 1

| BATTERY | POSITIVE ELECTRODE MIXTURE LAYER | | | | | |
|---|---|---|---|---|---|---|
| | LAYER CONFIGURATION | | VOLUME RATIO OF FIRST LAYER T1/(T1+T2) | RATIO OF MASS OF LFP TO MASS OF POSITIVE ELECTRODE ACTIVE MATERIAL IN FIRST LAYER | RATIO OF MASS OF LFP TO TOTAL MASS OF POSITIVE ELECTRODE ACTIVE MATERIAL | MIXTURE DENSITY |
| | FIRST LAYER (UPPER LAYER) | SECOND LAYER (LOWER LAYER) | Vol% | mass% | mass% | g/cm$^3$ |
| B1 | NCM SINGLE LAYER | | – | – | 0 | 2.7 |
| B2 | NCM SINGLE LAYER | | – | – | 0 | 3.0 |
| B3 | (LFP+NCM) SINGLE LAYER | | – | – | 10 | 3.0 |
| B4 | (LFP+NCM) SINGLE LAYER | | – | – | 20 | 3.0 |
| B5 | (LFP+NCM) SINGLE LAYER | | – | – | 50 | 2.7 |
| B6 | LFP+NCM | NCM | 75 | 6.7 | 5 | 3.0 |
| A1 | LFP+NCM | NCM | 75 | 13.3 | 10 | 3.0 |
| A2 | LFP+NCM | NCM | 75 | 26.6 | 20 | 3.0 |
| B7 | LFP+NCM | NCM | 75 | 33.3 | 25 | 3.0 |
| B8 | LFP+NCM | NCM | 50 | 10 | 5 | 3.0 |
| A3 | LFP+NCM | NCM | 50 | 15 | 7.5 | 3.0 |
| A4 | LFP+NCM | NCM | 50 | 30 | 15 | 3.0 |
| A5 | LFP+NCM | NCM | 50 | 40 | 20 | 3.0 |
| B9 | LFP+NCM | NCM | 50 | 50 | 25 | 3.0 |
| A6 | LFP+NCM | NCM | 25 | 40 | 10 | 3.0 |
| A7 | LFP+NCM | NCM | 25 | 80 | 20 | 3.0 |
| B10 | LFP+NCM | NCM | 20 | 25 | 5 | 3.0 |
| A8 | LFP+NCM | NCM | 20 | 50 | 10 | 3.0 |
| A9 | LFP+NCM | NCM | 20 | 80 | 16 | 3.0 |
| B11 | LFP | NCM | 20 | 100 | 20 | 2.9 |
| B12 | LFP+NCM | NCM | 15 | 66.6 | 10 | 3.0 |
| B13 | LFP+NCM | NCM | 12.5 | 80 | 10 | 3.0 |
| B14 | LFP | NCM | 10 | 100 | 10 | 3.0 |

FIG. 8

TABLE 2

| BATTERY | POSITIVE ELECTRODE MIXTURE LAYER | | | | EVALUATION | | |
|---|---|---|---|---|---|---|---|
| | VOLUME RATIO OF FIRST LAYER T1/(T1+T2) | RATIO OF MASS OF LFP TO MASS OF POSITIVE ELECTRODE ACTIVE MATERIAL IN FIRST LAYER | RATIO OF MASS OF LFP TO TOTAL MASS OF POSITIVE ELECTRODE ACTIVE MATERIAL | MIXTURE DENSITY | CAPACITY RETENTION AFTER 500cyc | AMOUNT OF GAS PRODUCED DURING OVERCHARGE | CONSTANT POWER OUTPUT VALUE IN LOW SOC |
| | Vol% | mass% | mass% | g/cm$^3$ | % | cm$^3$/Ah | W |
| B1 | NCM SINGLE LAYER | | 0 | 2.7 | 82 | 18 | 280 |
| B2 | NCM SINGLE LAYER | | 0 | 3.0 | 81 | 15 | 280 |
| B3 | (LFP+NCM) SINGLE LAYER | | 10 | 3.0 | 77 | 16 | 320 |
| B4 | (LFP+NCM) SINGLE LAYER | | 20 | 3.0 | 75 | 17 | 345 |
| B5 | (LFP+NCM) SINGLE LAYER | | 50 | 2.7 | 68 | 19 | 400 |
| B6 | 75 | 6.7 | 5 | 3.0 | 79 | 16.5 | 310 |
| A1 | 75 | 13.3 | 10 | 3.0 | 80 | 20 | 330 |
| A2 | 75 | 26.6 | 20 | 3.0 | 75 | 21 | 345 |
| B7 | 75 | 33.3 | 25 | 3.0 | 71 | 16.5 | 355 |
| B8 | 50 | 10 | 5 | 3.0 | 81 | 17 | 305 |
| A3 | 50 | 15 | 7.5 | 3.0 | 81 | 22 | 320 |
| A4 | 50 | 30 | 15 | 3.0 | 82 | 27 | 350 |
| A5 | 50 | 40 | 20 | 3.0 | 79 | 29 | 380 |
| B9 | 50 | 50 | 25 | 3.0 | 72 | 21 | 355 |
| A6 | 25 | 40 | 10 | 3.0 | 80 | 24 | 320 |
| A7 | 25 | 80 | 20 | 3.0 | 76 | 33 | 400 |
| B10 | 20 | 25 | 5 | 3.0 | 82 | 19 | 300 |
| A8 | 20 | 50 | 10 | 3.0 | 78 | 22 | 330 |
| A9 | 20 | 80 | 16 | 3.0 | 78 | 32 | 380 |
| B11 | 20 | 100 | 20 | 2.9 | 70 | 20 | 420 |
| B12 | 15 | 66.6 | 10 | 3.0 | 78 | 20 | 300 |
| B13 | 12.5 | 80 | 10 | 3.0 | 74 | 25 | 320 |
| B14 | 10 | 100 | 10 | 3.0 | 72 | 25 | 320 |

FIG. 9

TABLE 3

| LITHIUM IRON PHOSPHATE (LiFePO$_4$) POWDER | PARTICLE SIZE DISTRIBUTION | | | BET SPECIFIC SURFACE AREA |
|---|---|---|---|---|
| | D10 | D50 | D90 | |
| | μm | μm | μm | m$^2$/g |
| LFP(a) | 1.8 | 7.5 | 21.0 | 13.2 |
| LFP(b) | 2.1 | 8.4 | 22.3 | 11.6 |
| LFP(c) | 4.3 | 9.5 | 16.3 | 9.5 |
| LFP(d) | 4.4 | 12.9 | 17.4 | 8.6 |
| LFP(e) | 4.5 | 14.0 | 20.5 | 6.8 |
| LFP(f) | 0.7 | 5.5 | 17.2 | 14.6 |

FIG. 10

TABLE 4

| BATTERY | BET SPECIFIC SURFACE | POSITIVE ELECTRODE MIXTURE LAYER | | | | | MIXTURE DENSITY | MAXIMUM PORE SIZE |
|---|---|---|---|---|---|---|---|---|
| | | LAYER CONFIGURATION | | VOLUME RATIO OF FIRST LAYER T1(T1+T2) | RATIO OF MASS OF LFP TO MASS OF POSITIVE ELECTRODE ACTIVE MATERIAL IN FIRST LAYER | RATIO OF MASS OF LFP TO TOTAL MASS OF POSITIVE ELECTRODE ACTIVE MATERIAL | | |
| | | FIRST LAYER (UPPER LAYER) | SECOND LAYER (LOWER LAYER) | | | | | |
| | $m^2/g$ | | | Vol% | mass% | mass% | $g/cm^3$ | $\mu m$ |
| A10 | 2.35 | LFP(a)+NCM | NCM | 50 | 20 | 10 | 2.8 | 0.50 |
| A11 | 2.19 | LFP(b)+NCM | NCM | 50 | 20 | 10 | 2.8 | 0.53 |
| A12 | 1.98 | LFP(c)+NCM | NCM | 50 | 20 | 10 | 2.8 | 0.64 |
| A13 | 1.89 | LFP(d)+NCM | NCM | 25 | 40 | 10 | 2.8 | 0.70 |
| A14 | 1.71 | LFP(e)+NCM | NCM | 50 | 20 | 10 | 2.8 | 0.75 |
| A15 | 2.49 | LFP(f)+NCM | NCM | 50 | 20 | 10 | 3.0 | 0.53 |

FIG. 11

TABLE 5

| BATTERY | BET SPECIFIC SURFACE AREA OF LFP | POSITIVE ELECTRODE MIXTURE LAYER | | | | EVALUATION | | |
|---|---|---|---|---|---|---|---|---|
| | | VOLUME RATIO OF FIRST LAYER T1(T1+T2) | RATIO OF MASS OF LFP TO MASS OF POSITIVE ELECTRODE ACTIVE MATERIAL IN FIRST LAYER | MIXTURE DENSITY | MAXIMUM PORE SIZE | CAPACITY RETENTION AFTER 500cyc | AMOUNT OF GAS PRODUCED DURING OVER- CHARGE | CONSTANT POWER OUTPUT VALUE IN LOW SOC |
| | $m^2/g$ | Vol% | mass% | $g/cm^3$ | $\mu m$ | % | $cm^3/Ah$ | W |
| A10 | 13.2 | 50 | 20 | 2.8 | 0.50 | 80 | 18 | 320 |
| A11 | 11.6 | 50 | 20 | 2.8 | 0.53 | 81 | 20 | 320 |
| A12 | 9.5 | 50 | 20 | 2.8 | 0.64 | 82 | 24 | 320 |
| A13 | 8.6 | 25 | 40 | 2.8 | 0.70 | 84 | 25 | 320 |
| A14 | 6.8 | 50 | 20 | 2.8 | 0.75 | 84 | 26 | 280 |
| A15 | 14.6 | 50 | 20 | 3.0 | 0.53 | 78 | 15 | 320 |

NONAQUEOUS ELECTROLYTE SECONDARY BATTERY

CROSS REFERENCE TO RELATED APPLICATIONS

This application is a National Stage of International Application No. PCT/IB2015/001493 filed Sep. 2, 2015, claiming priority based on Japanese Patent Application No. 2014-182333 filed Sep. 8, 2014, the contents of all of which are incorporated herein by reference in their entirety.

BACKGROUND OF THE INVENTION

1. Field of the Invention

The present invention relates to a nonaqueous electrolyte secondary battery.

2. Description of Related Art

In order to improve output characteristics of a nonaqueous electrolyte secondary battery in a low state of charge (hereinafter, referred to as "SOC"), various studies have been made. For example, Japanese Patent Application Publication No. 2008-235150 (JP 2008-235150 A) discloses a nonaqueous electrolyte secondary battery in which a positive electrode active material contains: a lithium-containing metal oxide containing at least Co; and $Li_bFePO_4$ (wherein b satisfies a condition of $0 \leq b < 1$).

According to JP 2008-235150 A, for example, the positive electrode active material such as $LiNi_{0.80}Co_{0.15}Al_{0.05}O_2$ is mixed with 10 mass % or less of lithium iron phosphate having a lower action potential than $LiNi_{0.80}Co_{0.15}Al_{0.05}O_2$. As a result, an abrupt increase in the resistance of the positive electrode active material at a late stage of discharge (that is, low SOC) can be suppressed, and high output can be obtained over a wide range of SOC. However, in consideration of the behavior of a battery during overcharge, there is room for further improvement in such a technique.

For example, as a countermeasure against the overcharge of a battery, a large-sized battery for a vehicle may include a pressure-operated current interrupt device (hereinafter, referred to as "CID") that physically interrupts a conductive path when an internal pressure of the battery during overcharge exceeds a predetermined pressure (also referred to as "working pressure"). In this case, a positive electrode is required to have a function of causing a reaction with a gas producing agent (also referred to as "overcharge additive"), which is contained in an electrolytic solution or the like, to produce gas such that the CID is rapidly operated during overcharge.

However, in JP 2008-235150 A, lithium iron phosphate which is used as the positive electrode active material having a low action potential has significantly low conductivity. Therefore, this low conductivity is compensated for by coating surfaces of lithium iron phosphate particles with carbon. Further, in order to secure a predetermined battery output, it is necessary to increase a ratio of a conductive material in a positive electrode mixture into which lithium iron phosphate is mixed. Moreover, lithium iron phosphate has low capacity per volume. Therefore, the positive electrode capacity per volume decreases depending on the mixing amount of lithium iron phosphate. Accordingly, in order to maintain the battery capacity, it is necessary to improve the filling factor, that is, the mixture density of a positive electrode mixture layer depending on the mixing amount of lithium iron phosphate.

However, when the mixture density increases, the area of pores in the layer decreases, and the amount of an electrolytic solution which can be stored in the positive electrode mixture layer decreases. As a result, a contact ratio between the positive electrode active material and the gas producing agent contained in the electrolytic solution decreases, and the amount of gas produced during overcharge decreases. Further, there is a possibility in that the internal pressure cannot be efficiently increased due to a decrease in the area of a discharge path for the produced gas.

SUMMARY OF THE INVENTION

The present invention provides a nonaqueous electrolyte secondary battery in which the output in a low SOC is high, and the amount of gas produced during overcharge is large.

[1] According to an aspect of the invention, a nonaqueous electrolyte secondary battery including: a pressure-operated current interrupt device; a nonaqueous electrolytic solution containing a gas producing agent; and an electrode group in which a positive electrode and a negative electrode are arranged to face each other with a separator interposed between the positive electrode and the negative electrode. The positive electrode includes a positive electrode current collector and a positive electrode mixture layer that has a main surface and is formed on the positive electrode current collector. The positive electrode mixture layer includes a first layer that includes the main surface and a second layer that is formed closer to the positive electrode current collector side than the first layer. A ratio of the volume of the first layer to the volume of the positive electrode mixture layer is 20 vol % to 75 vol %. The first layer contains lithium iron phosphate and lithium nickel cobalt manganese composite oxide. A ratio of the mass of the lithium iron phosphate to the total mass of the lithium iron phosphate and the lithium nickel cobalt manganese composite oxide in the first layer is more than 0 mass % and 80 mass % or less. The second layer contains lithium nickel cobalt manganese composite oxide. A ratio of the mass of the lithium iron phosphate to the total mass of the positive electrode active material in the positive electrode mixture layer is 7.5 mass % to 20 mass %. A maximum pore size of the first layer is 0.50 μm to 0.70 μm.

In the nonaqueous electrolyte secondary battery having the above-described configuration, high output is obtained even in a low SOC, and a large amount of gas is produced during overcharge such that the CID can be rapidly operated. The reason is presumed to be as follows. In the following description, "lithium iron phosphate" will also be abbreviated as "LFP", and "lithium nickel cobalt manganese composite oxide" will also be abbreviated as "NCM".

In the above-described configuration, the positive electrode mixture layer has a two-layer structure including: a second layer (lower layer) containing NCM; and a first layer (upper layer) containing LFP and NCM. That is, LFP is biasedly distributed on the surface of the positive electrode mixture layer.

In the positive electrode mixture layer during charging, a reaction of releasing lithium ions ($Li^+$) is initiated from the surface portion close to the negative electrode. Therefore, in the positive electrode mixture layer during charging, a $Li^+$ concentration gradient is generated in a thickness direction thereof, and thus concentration polarization occurs in the vicinity of the surface. In the above-described nonaqueous electrolyte secondary battery, the first layer containing LFP is formed on the surface portion. Since LFP is a positive electrode active material having low conductivity (that is, high resistance) as described above, resistance polarization is likely to occur in the first layer. A combination of these polarizations causes a increase of positive electrode potential in a local portion of the first layer. Therefore, in the first layer, in order to alleviate the increase in the local portion of positive electrode potential, a reaction between the positive electrode active material and the gas producing agent is significantly accelerated. In the above-described nonaqueous electrolyte secondary battery, the positive electrode mixture layer contains LFP. As a result, it is considered that, even when the mixture density of the positive electrode mixture layer is somewhat high, it is difficult to decrease the amount of gas produced.

Further, in the above-described nonaqueous electrolyte secondary battery, the first layer includes the main surface of the positive electrode mixture layer. Therefore, the first layer is in contact with the separator. In general, the separator has a higher porosity than the positive electrode mixture layer. Therefore, an abundant amount of the nonaqueous electrolytic solution containing the gas producing agent is stored in the separator. Therefore, even when the gas producing agent is consumed due to the gas production reaction in the first layer, the gas producing agent is supplied from the separator to the first layer along with the nonaqueous electrolytic solution, and the gas production reaction can be continued without the depletion of the gas producing agent in the first layer. In this way, in the above-described nonaqueous electrolyte secondary battery, a predetermined amount of gas can be secured early during overcharge.

According to the research by the present inventors, when the ratio of the mass of LFP to the total mass of the positive electrode active material in the entire positive electrode mixture layer is less than 7.5 mass %, a desired output may not be obtained in a low SOC. When the mass ratio of LFP is more than 20 mass %, a balance between the output in a low SOC and the other characteristics (for example, charging-discharging cycle characteristics) may not be maintained. Accordingly, in the above-described nonaqueous electrolyte secondary battery, the ratio of the mass of LFP to the total mass of the positive electrode active material is limited to be 7.5 mass % to 20 mass %.

In the above-described nonaqueous electrolyte secondary battery, the ratio of the volume of the first layer to the volume of the positive electrode mixture layer is limited to be 20 vol % to 75 vol %. The reason why the volume ratio of the first layer is adjusted to be 20 vol % or more is as follows: when the volume ratio of the first layer, which is a main reaction field of the gas production reaction, is less than 20 vol %, the amount of gas produced may decrease. The reason why the volume ratio of the first layer is adjusted to be 75 vol % or less is as follows: when the volume ratio of the first layer is more than 75 vol %, a difference from a state where LFP is uniformly distributed over the entire positive electrode mixture layer (related art) can be reduced. That is, by widely distributing LFP having high resistance in a thickness direction of the positive electrode mixture layer, an increase in resistance becomes significant even in a region close to the positive electrode current collector. As a result, resistance polarization on the surface is reduced, and the amount of gas produced is reduced.

By adopting the above-described two-layer structure including the first layer and the second layer, the output in a low SOC and the amount of gas produced during overcharge can be simultaneously increased. However, a new possibility was found in that charging-discharging cycle characteristics may decrease under only the above-described conditions. That is, since there is a difference in the composition of the positive electrode active material between the first layer and the second layer, there is a difference in, for example, expansion or shrinkage amount or voltage behavior, which varies depending on charging-discharging cycles, therebetween. As a result, strain increases at an interface between both the layers, and interfacial peeling or the like partially occurs, which leads to a decrease in capacity. In order to prevent the possibilities, a configuration of increasing the mixing amount of a binder into the positive electrode mixture can be considered. However, the binder is a resistance component, which may cause a decrease in output. Therefore, in the above-described nonaqueous electrolyte secondary battery, the ratio of the mass of LFP to the total mass of LFP and NCM in the first layer is limited to be 80 mass % or less. As a result, the generation of strain can be prevented, and a decrease in capacity caused by charging-discharging cycles can be prevented.

Further, a maximum pore size of the first layer is 0.50 μm to 0.70 μm. As a result, gas produced from the first layer can be easily discharged, and the internal pressure can be efficiently increased.

In the nonaqueous electrolyte secondary battery, a BET specific surface area of the lithium iron phosphate may be 8.6 m$^2$/g to 13.2 m$^2$/g. By adjusting the BET specific surface area of LFP to be 8.6 m$^2$/g or more, the output in a low SOC can be improved. By adjusting the BET specific surface area of LFP to be 13.2 m$^2$/g or less, the maximum pore size of the first layer can be easily controlled to be 0.50 μm or more.

"BET specific surface area" described herein refers to the specific surface area measured using a BET method. The BET specific surface area can be measured using a general specific surface area measuring device (for example, "Macsorb HM model-1201" manufactured by Mountech Co., Ltd.). The maximum pore size of the positive electrode mixture layer (first layer) can be measured by mercury intrusion porosimetry using a pore distribution measuring device (for example, "Autopore IV 9500" manufactured by Shimadzu Corporation).

In the nonaqueous electrolyte secondary battery, a ratio of the mass of a conductive material to the mass of the first layer may be 5 mass % to 15 mass %.

In the nonaqueous electrolyte secondary battery, a ratio of the mass of a conductive material to the mass of the second layer may be 3 mass % to 11 mass %.

In the nonaqueous electrolyte secondary battery, a mixture density of the positive electrode mixture layer may be 2.5 g/cm$^3$ to 3.5 g/cm$^3$.

According to the above-described aspect of the invention, a nonaqueous electrolyte secondary battery can be provided in which the output in a low SOC is high, and the amount of gas produced during overcharge is large.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a schematic cross-sectional view taken along line V-V of FIG. 4; and

FIG. 6 is a schematic diagram showing a configuration example of a negative electrode according to the embodiment of the invention.

FIG. 7 is a table showing properties of positive electrode active material according to the embodiment of the invention and properties of positive electrode active material according to the comparative example.

FIG. 8 is a table showing evaluation of the respective batteries and the respective positive electrodes according to the embodiment of the invention and evaluation of the respective batteries and the respective positive electrodes according to the comparative example.

FIG. 9 is a table showing physical properties of each LFP powder according to the embodiment of the invention.

FIG. 10 is a table showing the configurations of the positive electrode mixture layers in the batteries A10 to A15 according to the embodiment of the invention.

FIG. 11 is a table showing the output in a low SOC, the amount of gas produced during overcharge, and charging-discharging cycle characteristics of the batteries A10 to A15 according to the embodiment of the invention.

DETAILED DESCRIPTION OF EMBODIMENTS

Hereinafter, an embodiment of the invention (hereinafter, referred to as "the embodiment") will be described in detail. However, the embodiment is not limited to the following description.

<Nonaqueous Electrolyte Secondary Battery>

Figure 1:
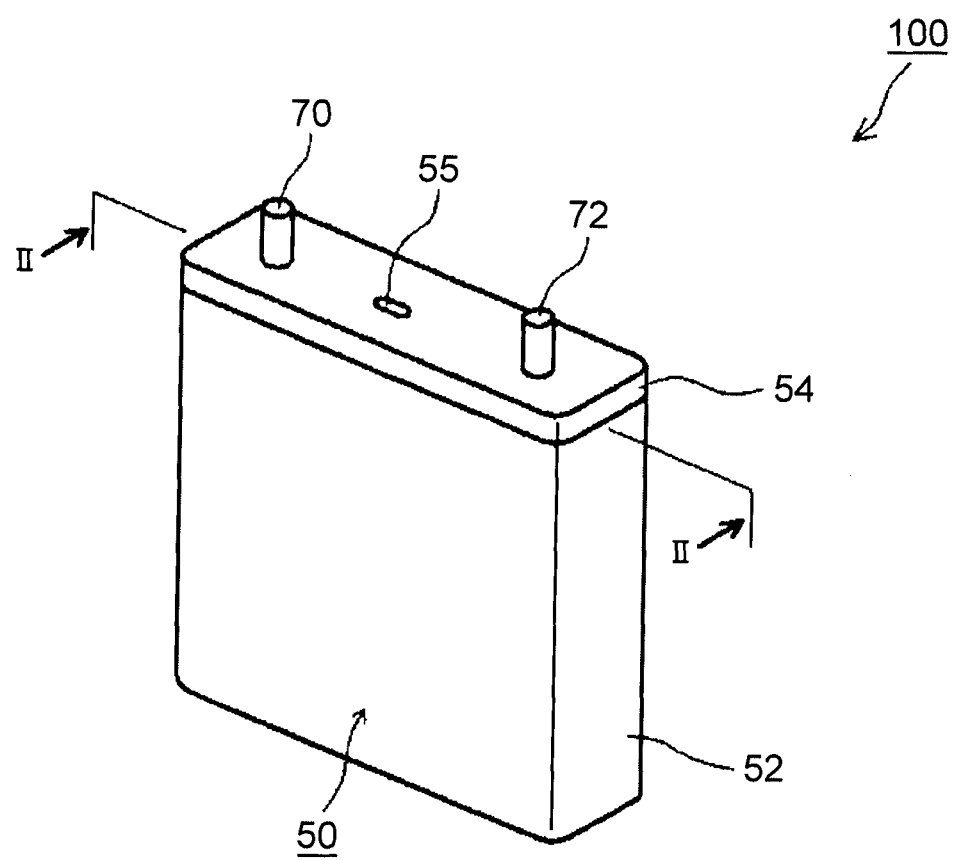
FIG. 1 is a schematic diagram showing a configuration example of a nonaqueous electrolyte secondary battery according to an embodiment of the invention.

FIG. 1 is a schematic diagram showing a configuration example of a nonaqueous electrolyte secondary battery according to the embodiment. Referring to FIG. 1, the battery 100 is a sealed battery and includes a square external body 50. The external body 50 includes a bottomed square case 52 and a lid 54. The external body 50 is formed of, for example, an aluminum (Al) alloy. The case 52 and the lid 54 are joined to each other by, for example, laser welding. A positive electrode terminal 70 and a negative electrode terminal 72 are provided on the lid 54. A safety valve 55 is adjusted to be opened under a higher pressure than a working pressure of a CID 30 described below.

Figure 2:
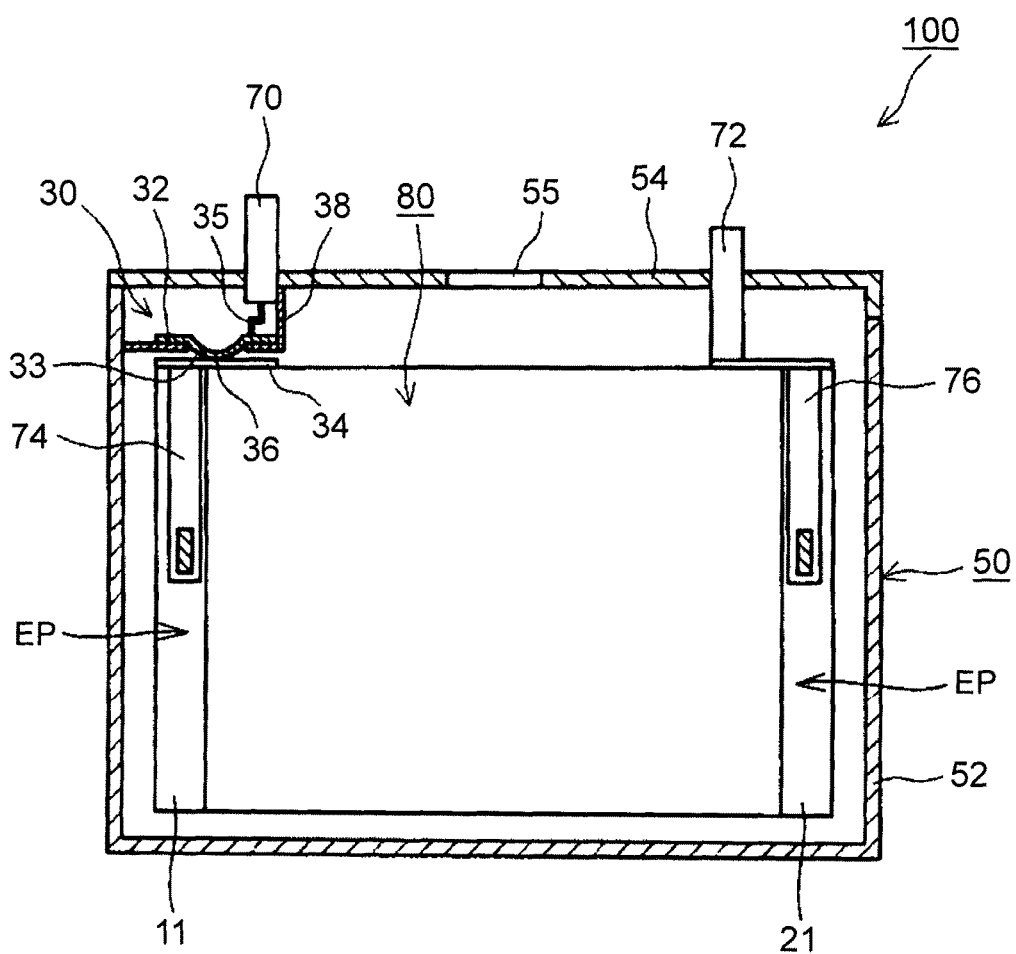
FIG. 2 is a schematic cross-sectional view taken along line II-II of FIG. 1.

Next, an internal structure of the battery 100 will be described. FIG. 2 is a schematic cross-sectional view showing the battery 100 taken along line II-II of FIG. 1. Referring to FIG. 2, the battery 100 includes an electrode group 80 and a nonaqueous electrolytic solution (not shown). The inside of the battery 100 is not completely filled with the above components, and a space volume is present therein. Here, "space volume" refers to the volume obtained by subtracting the volume of the components (the electrode group 80, the nonaqueous electrolytic solution, and the like) from the internal volume of the external body 50. The embodiment is particularly effective for a large-sized battery having a large space volume therein. This is because, as the space volume increases, the amount of gas required to operate the CID 30 increases. Examples of the large-sized battery include batteries (having a rated capacity of about 20 Ah or higher) which are used in a hybrid vehicle (HV), an electric vehicle (EV), and the like.

[Current Interrupt Device (CID)]

The pressure-operated CID 30 is arranged on a conductive path on the positive electrode side of the battery 100. The CID 30 includes a deformed metal plate 32, a connection metal plate 34, and an insulating case 38. The connection metal plate 34 is electrically connected to a positive electrode current collector plate 74. The deformed metal plate 32 has a curved portion 33 whose center is curved downward and is joined to the connection metal plate 34 at a tip end (junction 36) of the curved portion 33. The deformed metal plate 32 is electrically connected to the positive electrode terminal 70 through a current collector lead 35. In this way, a conductive path which connects the positive electrode terminal 70 and the positive electrode current collector plate 74 to each other is formed.

The insulating case 38 is formed of, for example, a resin, is arranged to surround the deformed metal plate 32, seals a space surrounded by the deformed metal plate 32, the insulating case 38, and the external body 50, and separates the above space from the other spaces inside the external body 50.

When the internal pressure of the external body 50 increases, the internal pressure acts on a bottom surface of the curved portion 33 of the deformed metal plate 32 such that the curved portion 33 is pushed up. When the internal pressure exceeds the working pressure, the curved portion 33 is flipped upside down, the junction 36 is disconnected from the positive electrode current collector plate 74, and the conductive path which connects the positive electrode terminal 70 and the positive electrode current collector plate 74 to each other is interrupted.

In FIG. 2, the CID 30 is provided on the conductive path on the positive electrode side. However, the CID may be provided on a conductive path on the negative electrode side or on both the conductive paths. In addition, the CID is not limited to the above-described configuration and may have any configuration as long as the CID operates in response to an increase in the internal pressure. For example, when a value of the internal pressure detected by a sensor exceeds a set value, an external circuit which interrupts the current may be set as the CID.

[Electrode Group]

Figure 3:
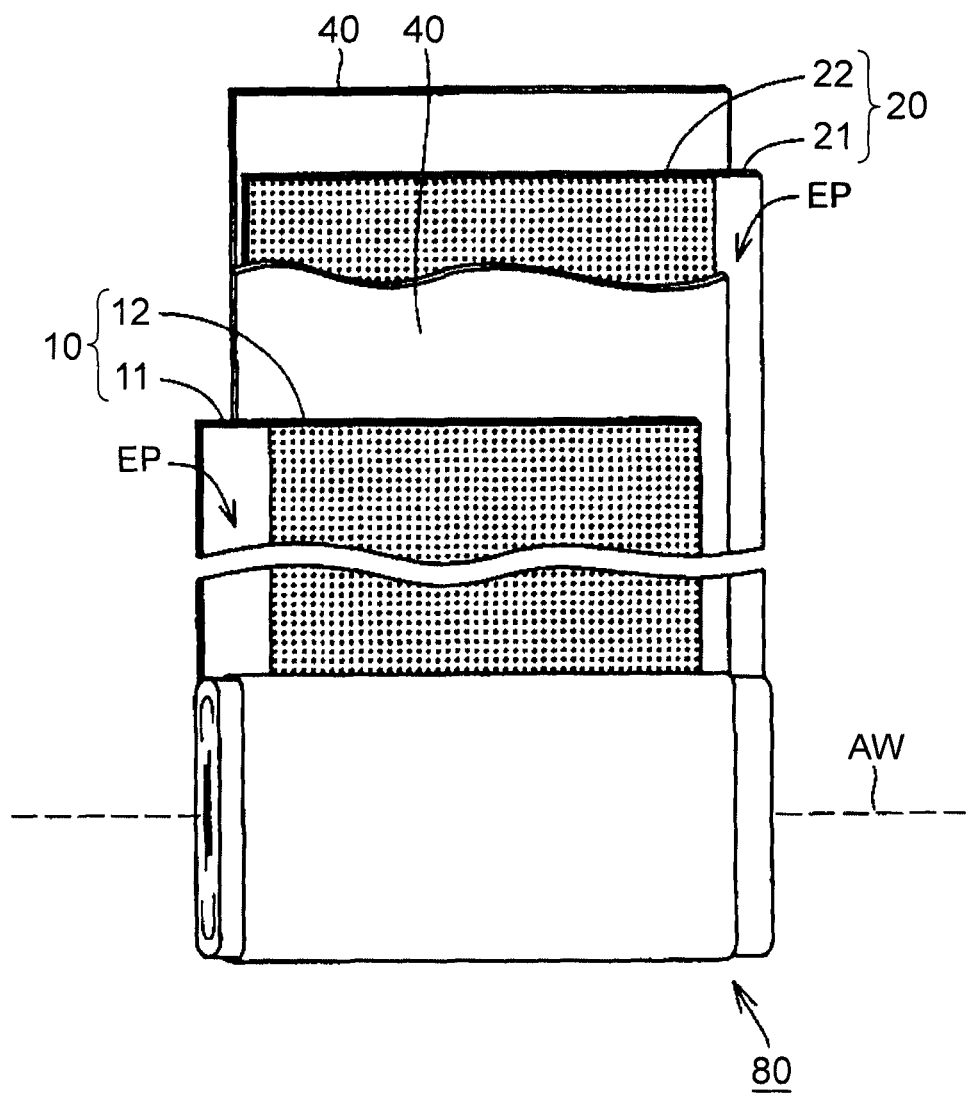
FIG. 3 is a schematic diagram showing a configuration example of an electrode group according to the embodiment of the invention.

FIG. 3 is a schematic diagram showing a configuration example of the electrode group. Referring to FIG. 3, the electrode group 80 is a wound electrode group. A positive electrode 10, a negative electrode 20, and separators 40 constituting the electrode group 80 are elongated belt-shaped sheet members. In the electrode group 80, the positive electrode 10 and the negative electrode 20 are arranged to face each other with the separators 40 interposed therebetween, and the electrode group 80 is wound in a longitudinal direction of the respective members.

Each of the positive electrode 10 and the negative electrode 20 has an exposure portion EP where a current collector (typically, metal foil) is exposed at an end portion on one side in a width direction (transverse direction). In the electrode group 80, the positive electrode 10 and the negative electrode 20 are arranged to face each other such that the exposure portions EP protrude in different directions on a winding axis AW.

Referring to FIG. 2, the exposure portions EP of the electrode group 80 are welded to the positive electrode current collector plate 74 and the negative electrode current collector plate 76, respectively. As described above, the positive electrode current collector plate 74 is connected to the positive electrode terminal 70 through the CID 30, and the negative electrode current collector plate 76 is connected to the negative electrode terminal 72. In the battery 100, as described below, a positive electrode mixture layer 12 includes a first layer 12a and a second layer 12b. As a result, a large amount of gas is produced during overcharge, and the CID 30 can be operated early.

[Positive Electrode]

Figure 4:
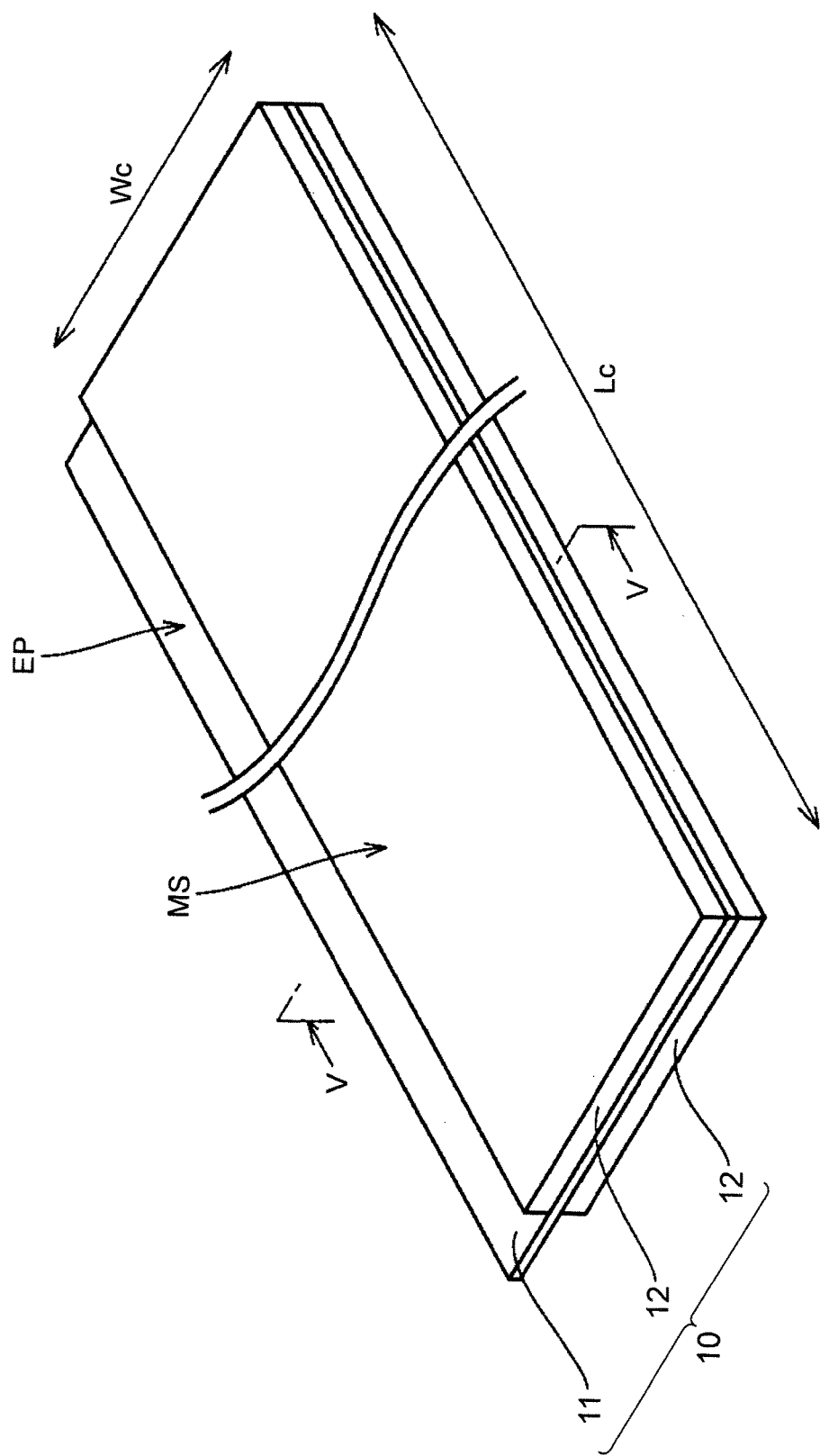
FIG. 4 is a schematic diagram showing a configuration example of a positive electrode according to the embodiment of the invention.

FIG. 4 is a schematic diagram showing a configuration example of the positive electrode 10. Referring to FIG. 4, the positive electrode 10 includes an elongated belt-shaped positive electrode current collector 11 and an elongated belt-shaped positive electrode mixture layer 12 that is formed on opposite main surfaces of the positive electrode current collector 11. The positive electrode current collector 11 is formed of, for example, Al foil. The positive electrode 10 can be manufactured using a method of the related art. For example, using a die coater, a positive electrode mixture paste obtained by dispersing a positive electrode mixture in a predetermined solvent is applied to the opposite main surfaces of the positive electrode current collector 11 and is dried. As a result, the positive electrode 10 can be manufactured. At this time, as the solvent, for example, N-methyl-2-pyrrolidone (NMP) can be used. In addition, the dried positive electrode mixture layer 12 may be pressed using a rolling mill or the like to adjust the thickness and the mixture density thereof. The mixture density of the positive electrode mixture layer 12 is, for example, 2.5 g/cm$^3$ to 3.5 g/cm$^3$.

[Positive Electrode Mixture Layer]

The positive electrode mixture layer 12 includes a main surface MS. FIG. 5 is a schematic cross-sectional view taken along line V-V of FIG. 4. Referring to FIG. 5, the positive electrode mixture layer 12 includes: the first layer 12*a* that includes the main surface MS; and the second layer 12*b* that is formed closer to the positive electrode current collector 11 side than the first layer 12*a*. The first layer 12*a* contains LFP 1 and NCM 2, and the second layer 12*b* contains the NCM 2. This two-layer structure can be formed, for example, using a method including: applying a positive electrode mixture paste for forming the second layer 12*b* to the main surface of the positive electrode current collector 11 and drying the positive electrode mixture paste; and applying a positive electrode mixture paste for forming the first layer 12*a* to the second layer 12*b* and drying the positive electrode mixture paste.

In the embodiment, it is preferable that the positive electrode mixture layer 12 consists of only the first layer 12*a* and the second layer 12*b*. However, the positive electrode mixture layer 12 may further include another layer within a range where the amount of gas produced during overcharge and the output in a low SOC are not excessively decreased. For example, a conductive layer containing a conductive material and a binder may be formed between the first layer 12*a* and the second layer 12*b* or between the second layer 12*b* and the positive electrode current collector 11.

[First Layer]

The first layer 12*a* contains the LFP 1 and the NCM 2 as the positive electrode active material and further contains a conductive material and a binder (both of which are not shown). A ratio of the mass of the positive electrode active material to the mass of the first layer 12*a* is, for example, 80 mass % to 95 mass %, preferably 80 mass % to 90 mass %, and more preferably 85 mass % to 90 mass %.

[Volume Ratio of First Layer]

A ratio (volume ratio) of the volume of the first layer 12*a* to the volume of the positive electrode mixture layer 12 is 20 vol % to 75 vol %. When the volume ratio of the first layer 12*a* is less than 20 vol %, portions where the polarizations occur cannot be sufficiently secured, and the amount of gas produced may decrease. When the volume ratio of the first layer 12*a* is more than 75 vol %, resistance polarization decreases, and the amount of gas produced may decrease.

From the viewpoints of further increasing the amount of gas produced and further improving the output in a low SOC, the volume ratio of the first layer 12*a* is preferably 20 vol % to 50 vol % and more preferably 25 vol % to 50 vol %.

In the embodiment, it is preferable that the application area of the first layer 12*a* (the area of the main surface MS) is substantially the same as the application area of the second layer 12*b*. The reason is as follows. When these areas are significantly different from each other, the mixture density may be non-uniform in a portion of the positive electrode mixture layer 12, which may decrease charging-discharging cycle characteristics. Here, "the application areas are substantially the same" implies that the application area of the first layer 12*a* is 0.97 times to 1.03 times the application area of the second layer 12*b*. When the application areas are substantially the same, the above-described ratio of the volume of the first layer 12*a* to the volume of the positive electrode mixture layer 12 can be calculated based on a thickness T1 of the first layer 12*a* and a thickness T2 of the second layer 12*b*. That is, the ratio of the volume of the first layer 12*a* to the volume of the positive electrode mixture layer 12 can be calculated in a percentage from T1/(T1+T2). Here, the thickness (T1+T2) of the positive electrode mixture layer 12 is, for example, 40 μm to 100 μm.

[Maximum Pore Size]

The maximum pore size of the first layer 12*a* is 0.5 μm or more. As a result, gas produced from the first layer 12*a* can be easily discharged, and the internal pressure can be efficiently increased during overcharge. According to experiment results described below, the maximum pore size of the first layer 12*a* is more preferably 0.53 μm or more and still more preferably 0.64 μm or more. As described below, the maximum pore size of the first layer 12*a* can be controlled, for example, by adjusting the BET specific surface area of the LFP 1 contained in the first layer 12*a*. That is, as the BET specific surface area of LFP powder is decreased, the size of pores contained in the first layer 12*a* can be increased. However, when the BET specific surface area is excessively small, the intercalation reaction of Li$^+$ is less likely to occur, and output characteristics may decrease. From this point of view, the maximum pore size is 0.70 μm or less.

[Lithium Iron Phosphate]

The first layer 12*a* contains particulate lithium iron phosphate (LFP 1). LFP is a complex phosphate represented by the chemical formula LiFePO$_4$ and has an olivine type crystal structure. LFP is capable of intercalation and deintercalation of Li+ at 3.3 V to 3.4 V (vs. Li$^+$/Li). Here, when the mixing ratio of LFP and NCM is set such that the battery capacity is the same as that of a battery in which a positive electrode active material is formed of only NCM, the above-described value of 3.3 V to 3.4 V corresponds to about 20% (low SOC) in terms of the SOC of the battery. Accordingly, in the embodiment, even when the SOC of the battery is low, the Li$^+$ concentration in LFP is still low, and LFP can intercalate Li$^+$. Further, in the embodiment, LFP is present in the surface (that is, the first layer 12*a* including the main surface MS) of the positive electrode mixture layer 12. Therefore, Li$^+$ supplied from the outside of the positive electrode mixture layer 12 can easily reach LFP. In this way, it is considered that high output can be exhibited in a low SOC.

In the chemical formula LiFePO4 representing LFP, a portion of Fe may be substituted with another element (for example, Co, Ni, or Mn) within a range where an increase in potential during overcharge and the output in a low SOC do not excessively deteriorate. In addition, LFP may be doped with a small amount of different element. Examples of the different element include magnesium (Mg), silicon (Si), calcium (Ca), titanium (Ti), vanadium (V), chromium (Cr), zinc (Zn), gallium (Ga), zirconium (Zr), niobium (Nb), molybdenum (Mo), tin (Sn), hafnium (Hf), and tungsten (W).

It is preferable that the surface of LFP is coated with carbon or the like because the conductivity of LFP is compensated for and output characteristics are further improved. For example, a carbon source (for example, a heavy aromatic residue (pitch) obtained from petrochemical process or a carbohydrate) is added to a precursor of LFP and is fired at a predetermined temperature. As a result, primary crystal grains formed of LFP are coated with carbon and aggregate each other to obtain powder of secondary particles. At this time, the coating amount of carbon is not particularly limited. For example, a mass ratio (LFP:C) of the matrix (LFP) to carbon (C) is 98:2 to 99:1.

The BET specific surface area of LFP (powder of secondary particles) is preferably 8.6 m$^2$/g to 13.2 m$^2$/g. By adjusting the BET specific surface area to be 8.6 m$^2$/g or more, the intercalation reaction of Li$^+$ is likely to occur during discharge, and the output in a low SOC is further improved. In addition, by adjusting the BET specific surface area to be 13.2 m$^2$/g or less, the maximum pore size of the first layer 12a can be easily controlled to be 0.5 μm or more. The BET specific surface area of the LFP powder is more preferably 8.6 m$^2$/g to 11.6 m$^2$/g and still more preferably 8.6 m$^2$/g to 9.5 m$^2$/g. The BET specific surface area of LFP can be adjusted, for example, by adjusting temperature conditions during the firing of the precursor of LFP.

From the viewpoint of realizing the above-described range of the BET specific surface area, D50 of LFP (powder of secondary particles) is, for example, 5.0 μm to 15.0 μm, preferably 7.5 μm to 14.0 μm, more preferably 8.4 μm to 12.9 μm, and still more preferably 8.4 μm to 9.5 μm. Here, "D50" refers to a particle size corresponding to an cumulative value of 50% in a particle size distribution obtained using a laser diffraction scattering method. Likewise, "D10" and "D90" refer to particle sizes corresponding to a cumulative value of 10% and a cumulative value of 90% in the same particle size distribution, respectively.

[Lithium Nickel Cobalt Manganese Composite Oxide]

The first layer 12a contains particulate lithium nickel cobalt manganese composite oxide (NCM 2). NCM is a compound represented by the formula LiNi$_a$Co$_b$Mn$_c$O$_2$ (wherein, 0<a<1, 0<b<1, 0<c<1, and a+b+c=1 are satisfied). NCM has high energy density per volume and superior heat stability.

In the formula LiNi$_a$Co$_b$Mn$_c$O$_2$, it is more preferable that a, b, and c satisfy 0.2<a<0.4, 0.2<b<0.4, and 0.2<c<0.4, and it is still more preferable that a, b, and c satisfy 0.3<a<0.35, 0.3<b<0.35, and 0.3<c<0.35. By a composition ratio of Ni, Co, and Mn satisfying the above-described relationship, a balance between energy density and heat stability is further improved. Here, NCM may be doped with a small amount of the above-described different element (for example, Mg).

In consideration of dispersibility during mixing, the D50 of NCM (powder of secondary particles) is, for example, 1 μm to 20 μm, preferably 3 μm to 15 μm, and more preferably 5 μm to 10 μm.

[Ratio of Mass of Lithium Iron Phosphate to Mass of Positive Electrode Active Material in First Layer]

A ratio of the mass of LFP to the total mass of LFP and NCM in the first layer 12a is more than 0 mass % to 80 mass %. When the mass ratio of LFP is more than 80 mass %, strain is generated between the first layer 12a and the second layer 12b, which may decrease charging-discharging cycle characteristics. From the viewpoint of further reducing the strain, the ratio of the mass of LFP to the total mass of LFP and NCM in the first layer 12a is preferably 50 mass % or less, more preferably 40 mass % or less, and still more preferably 30 mass % or less. On the other hand, in consideration of the output in a low SOC, the ratio of the mass of LFP to the total mass of LFP and NCM in the first layer 12a is preferably 5 mass % or more, more preferably 10 mass % or more, and still more preferably 15 mass % or more.

[Conductive Material]

As the conductive material, a material of the related art can be used. For example, one or more materials selected from acetylene black (AB), Ketjen black (registered trade name), flaky graphite, lump graphite, amorphous graphite, and vapor-grown carbon fiber (VGCF) can be used. In the first layer 12a containing the LFP 1, in order to secure conductivity, it is preferable that the mass ratio of the conductive material is set to be high. A ratio of the mass of the conductive material to the mass of the first layer 12a is, for example, 5 mass % to 15 mass %, preferably 7 mass % to 13 mass %, and more preferably 9 mass % to 11 mass %.

[Binder]

As the binder, a material of the related art can be used. For example, polyvinylidene fluoride (PVdF) or polytetrafluoroethylene (PTFE) can be used. A ratio of the mass of the binder to the mass of the first layer 12a is, for example, 1 mass % to 7 mass % and preferably 2 mass % to 6 mass %.

[Second Layer]

The second layer 12b is formed closer to the positive electrode current collector 11 side than the first layer 12a. The second layer 12b contains NCM as the positive electrode active material and further contains a conductive material and a binder. The second layer 12b may contain a smaller amount of LFP than the first layer 12a. However, it is preferable that the second layer 12b contains only NCM as the positive electrode active material because resistance polarization is efficiently caused to occur and the output in a low SOC is improved. In addition, NCM contained in the first layer 12a is not necessarily the same as NCM contained in the second layer 12b. For example, there may be a difference in a, b, and C in the formula LiNi$_a$Co$_b$Mn$_c$O$_2$ between NCM contained in the first layer 12a and NCM contained in the second layer 12b. However, in consideration of productivity (for example, the number of components), it is preferable that the same NCM is used in the first layer 12a and the second layer 12b. A ratio of the mass of the positive electrode active material to the mass of the second layer 12b is, for example, 85 mass % to 95 mass %, preferably 87 mass % to 93 mass %, and more preferably 88 mass % to 92 mass %.

As in the case of the first layer 12a, the second layer 12b also contains the conductive material and the binder described above in addition to the positive electrode active material (NCM). The second layer 12b does not contain LFP or contains a smaller amount of LFP than the first layer 12a. Therefore, in the second layer 12b, the mass ratio of the conductive material can be set to be low. A ratio of the mass of the conductive material to the mass of the second layer 12b is, for example, 3 mass % to 11 mass %, preferably 4 mass % to 10 mass %, and more preferably 5 mass % to 9 mass %. A ratio of the mass of the binder to the mass of the second layer 12b is, for example, 1 mass % to 5 mass % and preferably 2 mass % to 4 mass %.

[Ratio of Mass of Lithium Iron Phosphate to Total Mass of Positive Electrode Active Material]

A ratio of the mass of LFP to the total mass of the positive electrode active material in the entire positive electrode mixture layer 12 is 7.5 mass % to 20 mass %. When the mass ratio of LFP is less than 7.5 mass %, a desired output may not be obtained in a low SOC. When the mass ratio of LFP is more than 20 mass %, a balance between the output in a low SOC and charging-discharging cycle characteristics may not be maintained. From this point of view, the mass ratio of LFP is preferably 7.5 mass % to 15 mass % and more preferably 10 mass % to 15 mass %.

The positive electrode mixture layer 12 may further contain another positive electrode active material (for example, $LiCoO_2$, $LiNiO_2$, or $LiMn_2O_4$) in addition to LFP and NCM. However, in this case, it is preferable that a ratio of the mass of the other positive electrode active material to the total mass of the positive electrode active materials is set to be less than 50 mass % because a balance between the output in a low SOC and the amount of gas produced during overcharge can be maintained. Due to the same reason, the mass ratio of the other positive electrode active material is set to be more preferably less than 30 mass %, still more preferably less than 10 mass %, and most preferably 0 mass %.

[Negative Electrode]

FIG. 6 is a schematic diagram showing a configuration example of the negative electrode 20. Referring to FIG. 6, the negative electrode 20 includes an elongated belt-shaped negative electrode current collector 21 and an elongated belt-shaped negative electrode mixture layer 22 that is formed on opposite main surfaces of the negative electrode current collector 21. The negative electrode current collector 21 is formed of, for example, Cu foil. The negative electrode 20 can be manufactured using a method of the related art. For example, using a die coater, a negative electrode mixture paste obtained by dispersing a negative electrode mixture in a predetermined solvent is applied to the opposite main surfaces of the negative electrode current collector 21 and is dried. As a result, the negative electrode 20 can be manufactured. At this time, as the solvent, for example, water (including ion exchange water) can be used. In addition, the dried negative electrode mixture layer 22 may be pressed using a rolling mill or the like to adjust the thickness and the mixture density thereof. The mixture density of the negative electrode mixture layer 22 is, for example, 0.5 $g/cm^3$ to 2.0 $g/cm^3$.

The negative electrode mixture layer 22 is formed by attaching a negative electrode mixture containing a negative electrode active material, a thickener, and a binder to the main surfaces of the negative electrode current collector 21. The negative electrode active material is not particularly limited, and any material which can function as a negative electrode active material of a nonaqueous electrolyte secondary battery can be used. For example, a carbon negative electrode active material such as graphite or coke, or an alloy negative electrode active material of Si, Sn, and the like can be used. A ratio of the mass of the negative electrode active material to the mass of the negative electrode mixture layer 22 is, for example, 90 mass % to 99 mass %.

As the thickener and the binder, a material of the related art can be used. As the thickener, for example, carboxymethyl cellulose (CMC) or polyvinyl alcohol (PVA) can be used. As the binder, for example, styrene-butadiene rubber (SBR) or PTFE can be used. A ratio of the mass of the thickener and the binder to the mass of the negative electrode mixture layer 22 is, for example, 1 mass % to 10 mass %.

[Separator]

The separator 40 prevents electrical contact between the positive electrode 10 and the negative electrode 20 while allowing penetration of $Li^+$. As the separator 40, a microporous membrane formed of a polyolefin material is preferable from the viewpoints of mechanical strength and chemical stability. For example, a microporous membrane formed of polyethylene (PE), polypropylene (PP), or the like is preferable.

In the separator 40, plural microporous membranes may be laminated, or a heat resistance layer containing an inorganic filler (for example, alumina particles) may be formed on the surface thereof. The thickness of the separator 40 is, for example, 5 μm to 40 μm. The pore size and porosity of the separator 40 may be appropriately adjusted such that the air permeability is a desired value.

[Nonaqueous Electrolytic Solution]

The nonaqueous electrolytic solution is obtained by dissolving a Li salt in an aprotic solvent. Examples of the aprotic solvent which can be used include cyclic carbonates such as ethylene carbonate (EC), propylene carbonate (PC), butylene carbonate (BC), γ-butyrolactone (γBL), and vinylene carbonate (VC); and chain carbonates such as dimethyl carbonate (DMC), ethyl methyl carbonate (EMC), and diethyl carbonate (DEC). Among these aprotic solvents, a combination of two or more kinds is preferable from the viewpoints of electrical conductivity and electrochemical stability. In particular, a mixture of a cyclic carbonate and a chain carbonate is preferably used. At this time, a volume ratio of the cyclic carbonate to the chain carbonate is preferably 1:9 to 5:5.

As the Li salt, for example, lithium hexafluorophosphate ($LiPF_6$), lithium tetrafluoroborate ($LiBF_4$), lithium perchlorate (LiClO4), lithium hexafluoroarsenate ($LiAsF_6$), lithium bis(trifluoromethanesulfonyl)imide ($Li(CF_3SO_2)_2N$), or lithium trifluoromethanesulfonate ($LiCF_3SO_3$) can be used. Among these Li salts, a combination of two or more kinds may be used. The concentration of the Li salt in the nonaqueous electrolytic solution is not particularly limited and is preferably 0.5 mol/L to 2.0 mol/L from the viewpoint of improving output characteristics, charging-discharging cycle characteristics, and the like.

[Gas Producing Agent]

The nonaqueous electrolytic solution contains a gas producing agent. The gas producing agent is a compound having an oxidation potential in a charge region (hereinafter, referred to as "overcharge region") where the SOC of the battery exceeds 100%. For example, when the upper limit charge voltage of the battery is 4.0 V to 4.2 V, a compound having an oxidation potential of about 4.5 V or higher (vs. $Li^+/Li$) can be used as the gas producing agent. Specifically, for example, an aromatic compound such as cyclohexylbenzene (CHB), biphenyl (BP), biphenyl ether (BPE), tert-butylbenzene (TBB), or tert-amylbenzene (TAB), or a derivative thereof can function as the gas producing agent. Among these, CHB and BP are particularly preferable because the amount of gas produced is large.

These compounds starts electrolytic polymerization to produce a polymerization product when the positive electrode potential exceeds the oxidation potential thereof. This polymerization product increases the battery resistance and produces gas such that an increase in the internal pressure is accelerated. The mechanism of the gas production is not limited to the above configuration. As long as gas is produced in the overcharge region, any mechanism may be used to produce gas.

As the gas producing agent, not only one kind but also a combination of two or more kinds may be used. However, from the viewpoint of increasing the amount of gas produced, it is preferable that the gas producing agent contains CHB. Therefore, when a combination of two or more kinds is used, it is preferable that the composition thereof is selected such that a ratio of the mass of CHB to the total mass of the gas producing agent is 50 mass % or more. For example, CHB and BP having the same mass can be added to the nonaqueous electrolytic solution to function as the gas producing agent. The ratio of the mass of CHB to the total mass of the gas producing agent is more preferably 70 mass % or more and still more preferably 90 mass % or more.

The content of the gas producing agent in the nonaqueous electrolytic solution (that is, the addition amount of the gas producing agent to the nonaqueous electrolytic solution) is preferably 1 mass % to 7 mass %. When the content of the gas producing agent is less than 1 mass %, the desired amount of gas produced may not be secured. On the other hand, even when the content of the gas producing agent is more than 7 mass %, the amount of gas produced does not significantly increase, which is not economical. The content of the gas producing agent is more preferably 2 mass % to 5 mass % because the production cost can be reduced while securing a large amount of gas produced.

Hereinabove, the embodiment has been described using the square battery as an example. However, the embodiment is not limited to the square battery and may be applied to a cylindrical battery or a laminate battery (also referred to as "pouch type battery"). In the embodiment, the configuration of the electrode group is not limited to the wound type and may be a laminate type (also referred to as "stack type").

Hereinafter, the embodiment will be described in more detail using Examples. However, the embodiment is not limited to the following Examples.

Experiment 1. Examination on Positive Electrode Mixture Layer

In Experiment 1, the effects of the layer configuration of the positive electrode mixture layer, the mixing ratio of LFP, and the like on battery performance were examined. Specifically, the following batteries A1 to A9 and batteries B1 to B14 were prepared to evaluate the output in a low SOC, the amount of gas produced during overcharge, and charging-discharging cycle characteristics thereof. Here, the batteries A1 to A9 correspond to Examples, and the batteries B1 to B14 correspond to Comparative Examples.

[Battery A1]
1. Preparation of Lithium Iron Phosphate

Powder of lithium phosphate monohydrate, powder of lithium ferrous dihydrate, and powder of ammonium dihydrogen phosphate were prepared. These powders were mixed with each other in the same molar amount to prepare a precursor of LFP. Further, a carbon source (glucose) was added to the precursor, was fired at 800° C. for 12 hours, and was crushed to obtain LFP powder. Hereinafter, this LFP powder will be referred to as "LFP (d)".

2. Preparation of Positive Electrode

Referring to FIG. 4, the positive electrode 10 was manufactured which was a sheet member having an elongated belt shape and had the exposure portion EP at an end portion on one side in the width direction. In this experiment, the length Lc of the positive electrode 10 in FIG. 4 was 6150 mm, the width We of the positive electrode mixture layer 12 was 117 mm, and the electrode thickness was 120 µm. Here, "electrode thickness" refers to the sum of the thickness of the positive electrode current collector 11 and the thickness of the positive electrode mixture layer 12 that is formed on opposite main surfaces of the positive electrode current collector 11.

Powder of a positive electrode active material (NCM), powder of a conductive material (AB), and powder of a binder (PVdF) were kneaded with a solvent (NMP) to obtain a positive electrode mixture paste (hereinafter, referred to as "NCM-only paste") for forming the second layer 12b. In this NCM-only paste, a mixing ratio (positive electrode active material:conductive material:binder; mass ratio) of the positive electrode mixture (solid content) was 90:7:3.

Powder of a positive electrode active material (LFP and NCM), powder of a conductive material (AB), and powder of a binder (PVdF) were kneaded with a solvent (NMP) to obtain a positive electrode mixture paste (hereinafter, referred to as "mixed paste") for forming the first layer 12a. In the mixed paste, a mixing ratio (positive electrode active material:conductive material:binder; mass ratio) of the positive electrode mixture was 86:10:4, and a ratio of the mass of LFP to the total mass of LFP and NCM was 13.3 mass %.

The NCM-only paste was applied to the opposite main surfaces of the positive electrode current collector 11 (Al foil having a thickness of 15 µm) to have a predetermined coating weight (application mass per unit area) and was dried with hot air. As a result, the second layer 12b was formed. Further, the mixed paste was applied to the second layer 12b to have a predetermined coating weight and was dried with hot air. As a result, the first layer 12a was formed. In this way, the positive electrode mixture layer 12 was formed. Next, the positive electrode mixture layer 12 was pressed such that the mixture density thereof was 3.0 g/cm$^3$ to obtain the positive electrode 10.

Here, the coating weights of the first layer 12a and the second layer 12b were adjusted such that: in the pressed positive electrode mixture layer 12, the volume ratio of the first layer 12a (T1/(T1+T2), which was calculated from the thickness T1 of the first layer 12a and the thickness T2 of the second layer 12b, was the value shown in Table 1 of FIG. 7; and the ratio of the mass of LFP to the total mass of the positive electrode active material in the positive electrode mixture layer 12 was the value shown in Table 1 of FIG. 7.

3. Preparation of Negative Electrode

Referring to FIG. 6, the negative electrode 20 was manufactured which was a sheet member having an elongated belt shape and had the exposure portion EP at an end portion on one side in the width direction. In this experiment, the length La of the negative electrode 20 in FIG. 6 was 6300 mm, the width Wa of the negative electrode mixture layer 22 was 122 mm, and the electrode thickness was 130 µm.

Powder of a negative electrode active material (graphite), powder of a binder (SBR), and powder of a thickener (CMC) were kneaded with a solvent (water) to obtain a negative electrode mixture paste. In this negative electrode mixture paste, a mixing ratio (negative electrode active material:binder:thickener; mass ratio) of the negative electrode mixture (solid content) was 98:1:1.

The negative electrode mixture paste was applied to the opposite main surfaces of the negative electrode current collector 21 and was dried with hot air to form the negative electrode mixture layer 22. As a result, the negative electrode 20 was obtained.

4. Preparation of Nonaqueous Electrolytic Solution

LiPF6 (1.0 mol/L) was dissolved in a mixed solvent containing EC, DMC, and EMC at a volume ratio (EC:DMC:EMC) of 3:3:4, and CHB (2 mass %) and BP (2 mass %) were further added thereto. As a result, a nonaqueous electrolytic solution was prepared.

5. Assembly

The separators 40 having a thickness of 24 μm and a three-layer structure in which a PP layer, a PE layer, and a PP layer were laminated in this order were prepared. Referring to FIG. 3, the positive electrode 10 and the negative electrode 20 were wound such that they faced each other with the separators 40 interposed therebetween. As a result, an elliptical electrode group was obtained. Further, the electrode group was pressed in a flat shape to obtain the wound type electrode group 80.

Referring to FIG. 2, the case 52 and the lid 54 were prepared, in which the positive electrode terminal 70, the positive electrode current collector plate 74, the negative electrode terminal 72, and the negative electrode current collector plate 76 were provided on the lid 54 in advance. After the positive electrode current collector plate 74 and the negative electrode current collector plate 76 were connected to the electrode group 80, the electrode group 80 was inserted into the case 52, and the case 52 and the lid 54 were joined to each other by welding.

A predetermined amount of nonaqueous electrolytic solution was injected through a liquid injection hole (not shown) provided on the lid 54, and a sealing screw was fastened to the liquid injection hole to seal the inside of the case 52. In this way, a nonaqueous electrolyte secondary battery (battery A1) having a rated capacity (design capacity) of 25 Ah was obtained.

[Batteries A2 to A9 and Batteries B12 and B13]

The batteries A2 to A9 and the batteries B12 and B13 were obtained using the same method as that of the battery A1, except that the ratio of the volume of the first layer 12a to the volume of the positive electrode mixture layer 12, the ratio of the mass of LFP to the total mass of the positive electrode active material in the first layer 12a, and the ratio of the mass of LFP to the total mass of the positive electrode active material in the positive electrode mixture layer 12 were changed as shown in Table 1 of FIG. 7.

[Batteries B1 and B2]

The batteries B1 and B2 were obtained using the same method as that of the battery A1, except that the NCM-only paste was used, a single-layer positive electrode mixture layer was formed by changing the coating weight such that the battery capacity was the same as that of the battery A1, and the mixture density of the positive electrode mixture layer was adjusted to be the value shown in Table 1 of FIG. 7. In Table 1, the above layer configuration of the positive electrode mixture layer is shown as "NCM Single Layer".

[Battery B3]

The battery B3 was obtained using the same method as that of the battery A1, except that a positive electrode mixture paste having a mixing ratio (LFP:NCM:conductive material:binder; mass ratio) of the positive electrode mixture of 9:81:7:3 was used, and a single-layer positive electrode mixture layer was formed by changing the coating weight such that the battery capacity was the same as that of the battery A1. In Table 1 of FIG. 7, the above layer configuration of the positive electrode mixture layer is shown as "(LFP+NCM) Single-Layer". The (LFP+NCM) single-layer was made assuming a technique of the related art in which LFP was uniformly distributed over the entire positive electrode mixture layer.

[Batteries B4 and B5]

The batteries B4 and B5 were obtained using the same method as that of the battery B3, except that the ratio of the mass of LFP to the total mass of the positive electrode active material was changed as shown in Table 1 of FIG. 7.

[Batteries B6 to B10]

The batteries B6 to B10 were obtained using the same method as that of the batteries A2 to A9, except that the ratio of the mass of LFP to the mass of the positive electrode active material in the first layer 12a, and the ratio of the mass of LFP to the total mass of the positive electrode active material in the positive electrode mixture layer 12 were changed as shown in Table 1 of FIG. 7.

[Batteries B11 and B14]

The batteries B11 and B14 were obtained using the same method as that of the batteries A2 to A9, except that a positive electrode mixture paste having a mixing ratio (LFP:conductive material:binder; mass ratio) of the positive electrode mixture of 85:10:5 was used as the positive electrode mixture paste for forming the first layer, and the mixture density of the positive electrode mixture layer was adjusted to be the value shown in Table 1 of FIG. 7.

[Evaluation]

The respective batteries and the respective positive electrodes were evaluated using the following method. In the following description, the unit "C" for the current value refers to the current value at which the rated capacity of a battery is completely discharged in 1 hour. "CC" refers to the constant current, "CV" refers to the constant voltage, and "CP" refers to the constant power.

1. Evaluation of Output in Low SOC

First, in a thermostatic chamber set at 25° C., each battery was initially charged and discharged at a current value of 0.2 C in a voltage range of 4.1 V to 3.0 V to obtain the initial capacity of the battery. Next, in the same thermostatic chamber, an amount of electricity corresponding to SOC 20% was applied to the battery based on the initial capacity. Next, the battery was left to stand in a thermostatic chamber set at −15° C. for 4 hours, and level 3 CP discharging was performed thereon in the same environment for 8 seconds to 12 seconds. Then, a constant power output value at which the voltage reached 2.5 V in 10 seconds was obtained based on a relationship between the discharging time and the electric power. The results are shown in the item "Constant Power Output Value in Low SOC" of Table 2 of FIG. 8.

2. Evaluation of Amount of Gas Produced During Overcharge

A laminate battery was separately prepared according to the following steps [a] to [e] and was evaluated. The results are shown in Table 2 of FIG. 8. [a] A measurement positive electrode having a size of 35 mm×35 mm was cut out from the above-obtained positive electrode. Likewise, a measurement negative electrode having a size of 36 mm×36 mm was cut out from the above-obtained negative electrode. The measurement positive electrode and the measurement negative electrode were laminated with a separator interposed therebetween to prepare an electrode group. This electrode group was inserted into a laminate external body, and the nonaqueous electrolytic solution was injected thereinto. Next, an opening was sealed by thermal welding. As a result, a laminate battery having a rated capacity of 20 mAh was prepared. [b] The SOC of the laminate battery was adjusted to 100% (full charge) by CC-CV charging (CC current value: 1 C, CV voltage: 4.1 V, end current value: 0.1 C). [c] The volume of the laminate battery before the test was measured using Archimedes' principle. [d] In an environment of 60° C., the laminate battery was CC-charged at a current value of 1 C until the SOC thereof reached 140%. Next, the volume of the laminate battery after the test was measured using Archimedes' principle. [e] The volume ($cm^3$) before the test was subtracted from the volume ($cm^3$) after the test to obtain the amount of gas produced. Further, the obtained value was divided by the battery capacity (20 mAh) to obtain a value ($cm^3$/Ah). Using this value, the amount of gas produced was evaluated.

3. Evaluation of Charging-Discharging Cycle Characteristics

In an environment of 60° C., CC charging (current value: 2 C, end voltage: 4.1 V) and CC discharging (current value: 2 C, end voltage: 3.0 V) were set as one cycle. This charging-discharging cycle was performed 500 times. The capacity after the cycles was measured using the same method as in the measurement of the initial capacity. The capacity after the cycles was divided by the initial capacity to obtain a value. This value was expressed in a percentage as the capacity retention after 500 cycles. The results are shown in Table 2 of FIG. 8. In Table 2, the capacity retention after 500 cycles is shown as "Capacity Retention after 500 cyc".

[Results and Discussion]

1. Batteries A1 to A9 (Examples) and Batteries B1 to B14 (Comparative Examples)

As clearly seen from Tables 1 and 2, in the batteries A1 to A9 (Examples), the positive electrode mixture layer contained the first layer (upper layer) and the second layer (lower layer); the ratio of the volume of the first layer to the volume of the positive electrode mixture layer was 20 vol % to 75 vol %; the first layer contained LFP and NCM; the ratio of the mass of LFP to the total mass of LFP and NCM in the first layer was more than 0 mass % and 80 mass % or less; the second layer contained NCM; and the ratio of the mass of LFP to the total mass of the positive electrode active material in the positive electrode mixture layer was 7.5 mass % to 20 mass %. When the batteries A1 to A9 (Examples) were compared to the batteries B1 to B14 (Comparative Examples) which did not satisfy the above-described conditions, the output in a low SOC was high, and the amount of gas produced during overcharge increased.

2. Batteries B1 and B2 (Comparative Examples)

In the batteries B1 and B2 in which the entire positive electrode mixture layer was configured as the NCM single layer, the output in a low SOC was not sufficient. In addition, the amount of gas produced during overcharge was small. Further, it was found from the results of the battery B2 that, in the NCM single layer, when the mixture density increases, the amount of gas produced during overcharge decreases.

3. Batteries B3 to B5 (Comparative Examples)

In the battery B3 in which the entire positive electrode mixture layer was configured as the mixed layer (single layer) containing LFP and NCM, the output in a low SOC was improved by the mixing of LFP. However, there was no significant difference in the amount of gas produced during overcharge between the batteries B1 and B2. The reason is presumed to be that the filling factor of the positive electrode mixture layer was improved by the mixing of LFP.

It was found from the results of the batteries B4 and B5 that, in a case where the entire positive electrode mixture layer is configured as the mixed layer containing LFP and NCM, when the mass ratio of LFP increases, the output in a low SOC is improved; however, the amount of gas produced during overcharge barely increases, and the capacity retention after the cycles decreases.

4. When Volume Ratio of First Layer was 75 Vol % (Batteries A1, A2, B6, and B7)

When the batteries B3 was compared to the batteries A1 and A2, the ratios of the mass of LFP to the total mass of the positive electrode active material were the same. However, the amounts of gas produced during overcharge were significantly different from each other. That is, in the batteries A1 and A2 in which LFP was biasedly present in the upper layer (first layer) of the positive electrode mixture layer, the amount of gas produced significantly increased. The reason is presumed to be that, since LFP having high resistance was biasedly present in the upper layer, the polarizations were likely to occur, an increase in the potential of the upper layer became significant, and the gas production reaction was accelerated.

However, in the battery B6 in which the volume ratio of the first layer was 75 vol % and the ratio of the mass of LFP to the total mass of the positive electrode active material was 5 mass % (less than 7.5 mass %), the amount of gas produced was not sufficient. In the battery B7 in which the ratio of the mass of LFP to the total mass of the positive electrode active material was 25 mass % (more than 20 mass %), the amount of gas produced decreased. Further, in the battery B7, it was also found that the capacity retention after the cycles decreased.

5. When Volume Ratio of First Layer was 50 Vol % (Batteries A3 to A5, B8, and B9)

It was found that, as in the case where the volume ratio of the first layer was 75 vol %, when the ratio of the mass of LFP to the total mass of the positive electrode active material was in a range of 7.5 mass % to 20 mass %, the output in a low SOC was high, the amount of gas produced during overcharge was large, and the capacity retention after the cycles was high.

As compared to the case where the volume ratio of the first layer was 75 vol %, the output in a low SOC and the amount of gas produced were further improved. The reason is presumed to be as follows. Since the volume ratio of the first layer decreased, the localization of LFP in the entire positive electrode mixture layer was relatively high, the occurrence of the polarizations was accelerated, and the reaction efficiency between LFP and the nonaqueous electrolytic solution was improved.

6. When Volume Ratio of First Layer was 20 Vol % or More and Less than 50 Vol % (Batteries A6 to A9, B10, and B11)

It was found that, even when the volume ratio of the first layer was further decreased, as long as the ratio of the mass of LFP to the total mass of the positive electrode active material was 7.5 mass % to 20 mass %, the output in a low SOC was high, and the amount of gas produced during overcharge was large. However, in the battery B11 in which the first layer was configured as a LFP single layer (when the ratio of the mass of LFP to the mass of the positive electrode active material in the first layer was 100 mass %), charging-discharging cycle characteristics decreased. The reason is presumed to be that there was a significant difference in expansion or shrinkage amount between the first layer and the second layer. In the battery A9 in which the ratio of the mass of LFP to the mass of the positive electrode active material in the first layer was 80 mass %, superior battery performance was obtained. However, when the mass ratio of LFP in the first layer was increased to be more than 80 mass %, the same results as those of the battery B11 may be triggered. Accordingly, the ratio of the mass of LFP to the mass of the positive electrode active material in the first layer is required to be 80 mass % or less.

7. When Volume Ratio of First Layer was Less than 20 Vol % (Batteries B12 and B13)

When the volume ratio of the first layer was less than 20 vol %, the amount of gas produced during overcharge decreased. The reason is presumed to be that portions where the polarizations occurred were not able to be sufficiently secured. Accordingly, the volume ratio of the first layer is required to be 20 vol % or more.

8. When First Layer was Configured as LFP Single Layer (Batteries B11 and B14)

When the first layer was configured as the LFP single layer, the output in a low SOC was improved; however, the amount of gas produced during overcharge was not improved to a degree which was expected from the localization of LFP. In these batteries, charging-discharging cycle characteristics significantly decreased. The reason is presumed to be that, since there was a significant difference in, for example, expansion or shrinkage amount or voltage behavior between the first layer and the second layer, strain was generated therebetween. Accordingly, it is important to configure the first layer as the mixed layer containing LFP and NCM such that strain generated between the first layer and the second layer is alleviated.

Experiment 2. Examination on LFP

In Experiment 2, the effects of the physical properties of lithium iron phosphate powder on battery performance were examined. Specifically, the following batteries A10 to A15 were prepared to evaluate the output in a low SOC, the amount of gas produced during overcharge, and charging-discharging cycle characteristics thereof using the same method as described above. Here, the batteries A10 to A13, and A15 correspond to Examples.

1. Preparation of Lithium Iron Phosphate

Iron powder, phosphoric acid, and lithium hydroxide were caused to react with each other in water, and oxalic acid was added thereto dropwise, followed by drying. As a result, a precursor of LFP was obtained. This precursor was added to a carbon source (glucose), was fired at 550° C. for 12 hours, and was crushed. As a result, LFP (a) was obtained.

LFP (b) was obtained using the same method as that of LFP (a), except that the firing temperature was changed to 600° C.

LFP (c) was obtained using the same method as that of LFP (d), except that the firing temperature was changed to 550° C.

LFP (e) was obtained using the same method as that of LFP (d), except that the firing temperature was changed to 650° C.

LFP (f) was obtained using the same method as that of LFP (d), except that the firing temperature was changed to 500° C. The physical properties of each LFP powder obtained as described above were measured using a laser diffraction scattering particle size distribution analyzer "Microtorac MT 3000 II" (manufactured by Nikkiso Co., Ltd.) and "Macsorb HM model-1201" (manufactured by Mountech Co., Ltd.) The results are shown in Table 3 of FIG. 9.

2. Preparation of Batteries

Using the above-described LFP (a) to LFP (f), batteries A10 to A15 were prepared with the same method as that of the above-described battery A1. In the batteries A10 to A15, the configurations of the positive electrode mixture layers are shown in Table 4 of FIG. 10. The numeral values shown in the item "BET Specific Surface Area" of Table 4 of FIG. 10 are the BET specific surface areas of the positive electrode mixture used for forming the first layer.

The numerical values shown in the item "Maximum Pore Size" were measured as follows. First, three measurement samples having a size of 200 mm×55 mm were cut out from the positive electrode used in each battery. In order to collect the measurement samples, the positive electrode was equally divided into three regions having the same area in the longitudinal direction, and one measurement sample was collected from each region. Next, using a pore distribution measuring device (for example, "Autopore IV 9500" manufactured by Shimadzu Corporation), the maximum pore sizes of the respective measurement samples were measured. The numerical values shown in Table 4 of FIG. 10 were obtained based on the arithmetic average of the maximum pore sizes. It was found from Table 4 of FIG. 10 that, since the kind of LFP contained in the first layer was changed, the maximum pore size of the positive electrode mixture layer was changed. Accordingly, it can be said that the maximum pore size measured as described reflects the pore distribution of the first layer, that is, the maximum pore size of the first layer. In the above-described batteries A1 to A9, the maximum pore sizes measured using the same method were 0.5 μm to 0.7 μm.

[Evaluation]

The output in a low SOC, the amount of gas produced during overcharge, and charging-discharging cycle characteristics of the batteries A10 to A15 were evaluated using the same method as described above. The results are shown in Table 5 of FIG. 11.

[Results and Discussion]

1. Regarding Maximum Pore Size

It was found from Table 5 of FIG. 11 that, as the maximum pore size increases, the amount of gas produced during overcharge increases. As described above, it is considered that the maximum pore size reflects the pore distribution of the first layer. Accordingly, it is estimated that the amount of gas produced increased because the nonaqueous electrolytic solution easily penetrated into the first layer through pores, and the produced gas were easily discharged through the pores.

In consideration of only the amount of gas produced during overcharge, it can be said that, the larger the maximum pore size, the better. However, when the maximum pore size was 0.75 μm, the output in a low SOC decreased (battery A14). The reason is presumed to be that, since the BET specific surface area of LFP (e) used in the battery A14 was excessively small, the intercalation reaction of Li$^+$ during overcharge was less likely to occur. Accordingly, the maximum pore size of the positive electrode mixture layer (first layer) is required to be 0.70 μm or less.

2. Regarding BET Specific Surface Area of Lithium Iron Phosphate

As shown in Table 5 of FIG. 11, the BET specific surface area of LFP (e) in which a decrease in output in a low SOC was verified is 6.8 m$^2$/g. When the BET specific surface area of LFP was in a range of 8.6 m$^2$/g to 13.2 m$^2$/g, a balance between the output in a low SOC; and the amount of gas produced during overcharge and charging-discharging cycle characteristics was superior. However, it was found that, when the BET specific surface area of LFP is 14.6 m2/g, the amount of gas produced decreases (battery A15). The reason is not clear at the moment, but is presumed to be as follows: when the BET specific surface area of LFP is excessively large, the pore size of the powder increases, the pores are likely to be collapsed during the pressing of the positive electrode mixture layer, and the pore size of the positive electrode mixture layer is small.

It can be said from the above results that the BET specific surface area of LFP is preferably 8.6 m²/g to 13.2 m²/g, more preferably 8.6 m²/g to 11.6 m²/g and still more preferably 8.6 m²/g to 9.5 m²/g.

Hereinabove, the embodiment and Examples of the invention have been described. However, the embodiment and Examples disclosed herein are merely exemplary in all respects and are not particularly limited. The scope of the invention is defined not by the above description but by claims, and equivalent meanings to claims and all the changes within claims are intended to be embraced therein.

What is claimed is:

1. A nonaqueous electrolyte secondary battery comprising:
    a pressure-operated current interrupt device;
    a nonaqueous electrolytic solution containing a gas producing agent; and
    an electrode group in which a positive electrode and a negative electrode are arranged to face each other with a separator interposed between the positive electrode and the negative electrode, wherein
    the positive electrode includes a positive electrode current collector and a positive electrode mixture layer that has a main surface and is formed on the positive electrode current collector,
    the positive electrode mixture layer includes a first layer that includes the main surface and a second layer that is formed closer to the positive electrode current collector side than the first layer,
    a ratio of a volume of the first layer to a volume of the positive electrode mixture layer is 20 vol % to 75 vol %,
    the first layer contains lithium iron phosphate and lithium nickel cobalt manganese composite oxide,
    a ratio of a mass of the lithium iron phosphate to a total mass of the lithium iron phosphate and the lithium nickel cobalt manganese composite oxide in the first layer is more than 0 mass % and 80 mass % or less,
    the second layer contains lithium nickel cobalt manganese composite oxide,
    a ratio of the mass of the lithium iron phosphate to a total mass of a positive electrode active material in the positive electrode mixture layer is 7.5 mass % to 20 mass %, and
    a maximum pore size of the first layer is 0.50 μm to 0.70 μm.

2. The nonaqueous electrolyte secondary battery according to claim 1, wherein
    a BET specific surface area of the lithium iron phosphate is 8.6 m²/g to 13.2 m²/g.

3. The nonaqueous electrolyte secondary battery according to claim 1, wherein
    a ratio of a mass of a conductive material to a mass of the first layer is 5 mass % to 15 mass %.

4. The nonaqueous electrolyte secondary battery according to claim 1, wherein
    a ratio of the mass of a conductive material to a mass of the second layer is 3 mass % to 11 mass %.

5. The nonaqueous electrolyte secondary battery according to claim 1, wherein
    a mixture density of the positive electrode mixture layer is 2.5 g/cm³ to 3.5 g/cm³.

* * * * *